Reissued Apr. 8, 1952 Re. 23,478

UNITED STATES PATENT OFFICE 23,478

PROCESS FOR PRODUCING ANTIHALATION PHOTOGRAPHIC ARTICLE

André Emile Van Dormael, Heverlee-Louvain, and Laurent Aloys Van der Auwera, Mortsel-Antwerp, Belgium, assignors to Gevaert Photo-Producten N. V., Mortsel-Antwerp, Belgium, a company of Belgium No Drawing. Original No. 2,529,890, dated November 14, 1950, Serial No. 775,741, September 23, 1947. Application for reissue August 7, 1951, Serial No. 240,815. In Great Britain September 27, 1946

1 Claim. (Cl. 117—34)

Matter enclosed in heavy brackets [ ] appears in the original patent but forms no part of this reissue specification; matter printed in italics indicates the additions made by reissue.

This invention relates to colored photographic layers, especially to anti-halation- and filter layers and to the manufacture thereof.

It is already known to prepare hemitricarboxonoles by the following reaction:

FORMULA I

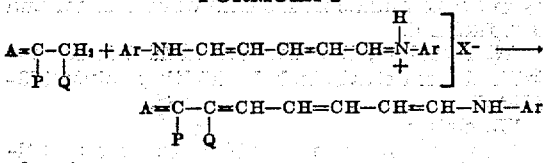

wherein

P=an organic group,
Q=an organic group,
or P and Q together=the non-metallic atoms necessary for completing a cyclic basic nucleus,
Ar=an aryl group,
A=an atom of the chalcogen group.

Hemitricarboxonoles containing an hydroxyl substituent in the polymethine chain, however, are not known hitherto.

It is an object of the present invention to provide a new process for the manufacture of photographic layers, especially anti-halation- and filter layers.

Another object of the present invention is to provide new colored photographic layers.

Still a further object of the present invention is to provide photographic material containing a colored layer according to this invention.

Now we have found that very well colored photographic layers, especially anti-halation- or filter layers, may be obtained by coating a photographic support or layer with a solution of an aromatic amine and a compound of the general

FORMULA II

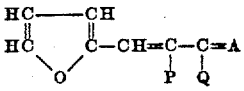

wherein

P=an organic group such as CN, COOH, carbalkoxy, acyl,
Q=an organic group such as acyl, aryl, alkylamino, arylamino, hydroxyl, alkoxyl, carboxyl, carbalkoxy, or P and Q together=the non-metallic atoms necessary for completing a heterocyclic nucleus, occasionally having a fused-on arylene group,
A=an atom of the chalcogen group.

This reaction may be represented as follows:

III

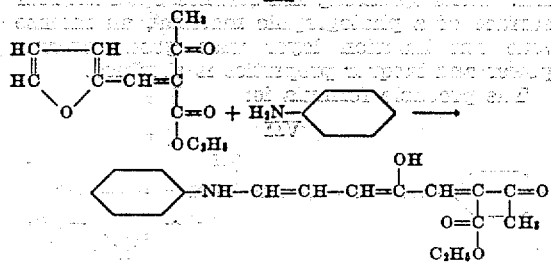

The reaction runs more easily in an acid medium.

The starting product according to the above general formula (II) may be prepared with ease from furfurol and a compound with reactive methylene group:

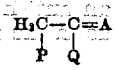

according to the known methods.

It is possible to add known anti-halation- or filter dyestuffs to the solution used for coating on a new colored photographic layer. Said solution may be incorporated in a colloid layer, or to said solution may be added a colloid binder, or it may be coated or spread without the assistance of a colloid binder.

The following examples illustrate the invention more clearly, without limiting, however, its scope.

Example 1

10 g. furfurylidene-acetyl-acetic acid ethyl ester

IV

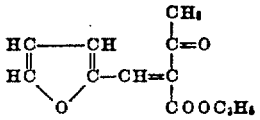

prepared from furfurol and acetyl-acetic ethyl ester according to the particulars given by E. Knoevenagel in Ber. 31 (1898) 734, dissolved in 100 cm.³ of ethyl alcohol, are treated with 7 g. anthranilic acid dissolved in 90 cm.³ ethyl alcohol, and next with 14 g. methylene-disalicylic acid in 130 cm.³ ethyl alcohol.

After spreading this solution upon the rear surface of a photographic material, an intense violet anti-halation layer with good covering power and lacquer properties is obtained. The probable formula is:

V

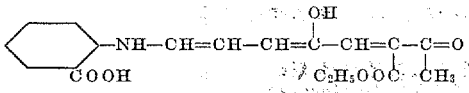

Example 2

13 g. furfurylidene-4-methyl-3-phenyl-1-pyrazolone-5.

VI

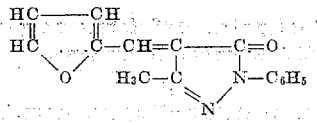

prepared from furfurol and methyl-3-phenyl-1-pyrazolone-5 according to the instructions given by J. Tambor in Ber. 33 (1900) 870, dissolved in 250 cm.³ of ethyl alcohol, are treated with 5 g. aniline in 20 cm.³ of ethyl alcohol and with 14 g. methylene-disalicylic acid in 140 cm.³. ethyl alcohol. After spreading this solution upon the rear surface of a photographic material, an intense blue anti-halation layer with good covering power and lacquer properties is obtained.

The probable formula is:

VII

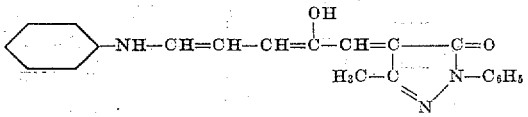

Example 3

6.5 g. furfurylidene-4-methyl-3-phenyl-1-pyrazolone-5, dissolved in 150 cm.³ ethyl alcohol, are treated with 3 g. N-methyl-aniline in 20 cm.³ alcohol and 7 g. methylene-disalicylic acid in 90 cm.³ alcohol. After spreading this solution upon a glass plate, an anti-halation layer with the same properties as in the foregoing example is obtained.

The probable formula is:

VIII

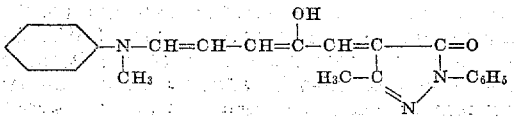

Example 4

2.4 g. furfurylidene-cyan-acetic acid anilide

IX

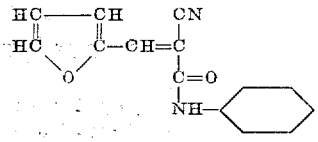

dissolved in 100 cm.³ ethyl alcohol are treated with 4.2 g. piperidine in 50 cm.³ ethyl alcohol and 2.5 g. methylene-disalicylic acid in 100 cm.³ ethyl alcohol. After spreading this solution upon a glass plate, an intense red anti-halation layer with good covering power and lacquer properties is obtained.

Probable formula according to Formula X

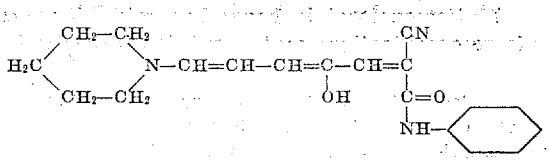

The furfurylidene-cyan-acetic acid anilide may be prepared by refluxing during 15 minutes 8 g. cyan acetic anilide in 120 cm.³ ethyl alcohol and 5 g. furfurol.

After cooling, the reaction product is recrystallized from ethyl alcohol. Melting point: 178–179° C.

We claim:

A process for the manufacture of an anti-halation layer on a photographic glass plate, which comprises spreading upon the glass plate a mixture of furfurylidene-4-methyl-3-phenyl-1-pyrazolone-5 dissolved in alcohol, *aniline in alcohol*, and methylene-disalicylic acid in alcohol.

LAURENT ALOYS VAN DER AUWERA.
ANDRÉ EMILE VAN DORMAEL.

REFERENCES CITED

The following references are of record in the file of this patent or the original patent:

UNITED STATES PATENTS

| Number | Name | Date |
|---|---|---|
| 1,631,421 | Lohofer | June 7, 1927 |
| 1,900,459 | Moyse | Mar. 7, 1933 |
| 1,939,171 | Hickman | Dec. 12, 1933 |
| 2,158,287 | Konig | May 16, 1939 |
| 2,188,624 | Brooker | Jan. 9, 1940 |
| 2,199,542 | Konig | May 7, 1940 |
| 2,258,609 | Hill | Oct. 14, 1941 |
| 2,322,006 | Fierke et al. | June 15, 1943 |